Figure 1:
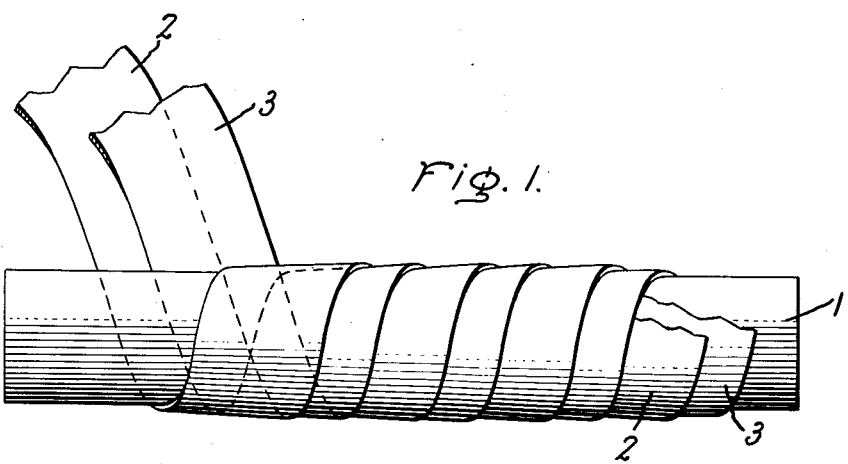

May 8, 1962 K. H. CRAM ETAL 3,033,727
PROCESS FOR MAKING VOID-FREE INSULATED CONDUCTORS
Filed Nov. 9, 1956

Inventors:
Kenneth H. Cram,
John W. Wetzel,
by Joseph T. Cohen
Their Attorney.

United States Patent Office 3,033,727
Patented May 8, 1962

3,033,727
PROCESS FOR MAKING VOID-FREE
INSULATED CONDUCTORS
Kenneth H. Cram, Lawrence, Kans., and John W. Wetzel, Pittsfield, Mass., assignors to General Electric Company, a corporation of New York
Filed Nov. 9, 1956, Ser. No. 621,412
6 Claims. (Cl. 156—5.6)

This invention is concerned with a method of heat shrinking oriented or stretched organic polymers to make void-free structures. More particularly, the invention relates to a process which comprises (1) wrapping an oriented or stretched solid polyolefin which has been cross-linked by irradiation with high energy electrons, around a solid body, there being interposed between the oriented polyolefin and the solid body, a solid, cohesive layer of a thermoplastic polyolefin having a softening temperature above 80° C. (e.g., from 80° to 150° C.) and (2) heating the assembly at a temperature above 100° C. to effect shrinkage of the oriented polymer, thereby causing fusion of the thermoplastic layer and filling in of any voids usually present when said oriented, cross-linked (e.g., thermoset) polymer is heated and shrunk in the absence of the thermoplastic layer. The invention also includes products obtained in accordance with the above-described process.

In the co-pending application of Paul A. Goodwin and John R. Stirrat, Serial No. 518,403, filed June 27, 1955, now Patent No. 2,961,336, there is disclosed and claimed a process for causing an oriented organic polymer, specifically oriented, polyethylene which has been irradiated with high energy electrons, to shrink and tighten around objects by heating the oriented polymer at temperatures well above 100° C. This application describes a process for insulating, for instance, conductors by wrapping oriented (that is, stretched or cold-drawn) polyethylene which has been irradiated with high energy electrons around a conductor, and thereafter applying heat to the oriented polyethylene to cause the latter to shrink and form a compact wrapped structure. If the temperature is sufficiently high, e.g., temperatures of 150° to 200° C. are disclosed in the application, the various layers even appear to fuse together. Although this process gives tight, compact structures, nevertheless it has been found that, especially where the irradiated polyethylene tape is wrapped in a spiral fashion around a bar in such position that each wind overlaps the preceding wind, there are small wedge-shaped voids or air gaps at the edges of the tape underneath the covering layers of tape or film.

The presence of these small voids or air gaps as described above in electrical components, limits the voltage at which the insulated conductor can be operated. Thus, conditions must usually be chosen below the corona starting voltage because insulating organic polymers, and polyethylene in particular, are liable to damage by electrical discharge. Continuous operation of equipment insulated in this fashion above the corona starting voltage will eventually result in failure of the insulation due to corona fatigue.

This level of electrical stress may well be below the dielectric strength volume of polyethylene or of any other organic polyolefin in a solid, void-free layer. However, in a taped construction, voids are created at each wrap and these voids provide areas of discharge within the insulation, which erode the insulation and eventually lead to electrical failure. Thus, in taped constructions the operating voltage is dictated by the corona start voltage which is dependent upon the number and size of voids and not on the dielectric strength of the material. Even utmost care will not completely eliminate these voids.

Unexpectedly, we have discovered that advantage can be taken of the constricting and contracting force produced by the heat shrinkage of thermoset (i.e., substantially non-heat-fusible), oriented polymers whereby one is able to reduce and substantially eliminate the voids which have been found to exist in the past in laminated wrapped structures of the type described above. In accordance with our discovery, we employ in combination with the oriented, shrinkable, thermoset (e.g., high energy electron-irradiated), polymeric outer layer, an inner layer of a thermoplastic polyolefin which softens at the temperatures at which heat shrinking of the oriented polymer takes place, i.e., above 80° C. At the heat-shrinking temperature, the compressive action of the wraps of the heat-shrinkable, oriented polymer squeezes the thermoplastic polymer into the voids, thus filling the voids and yielding solid structures which are substantially void-free, both internally and edgewise. It has been found that by employing this type of construction and procedure, there is no visual evidence of any voids and the corona starting voltage is exceptionally and unexpectedly high, indicating again freedom from external voids in the composite structure.

In the practice of our invention, we employ layers of solid polyolefins in which one layer is a substantially thermoset polymer having been converted to this state by irradiation with high energy electrons, as is more particularly described in Lawton and Bueche application Serial No. 324,552, filed December 6, 1952 and assigned to the same assignee as the present invention. The other layer (or layers) is a thermoplastic polyolefin layer, which is capable of fusion or can be caused to flow or soften under pressure at temperatures of from 80° C. and higher, for instance, at temperatures of from about 110° C. to 200° C. The thermoset, oriented polymer is relatively dimensionally stable when heated to a temperature which permits the thermoplastic layer to flow in a plastic manner when sufficient force is applied. The tensile force developed by the thermoset, oriented polymer is used to compress the second or thermoplastic material to force the latter to flow into the voids in the wrapped structure when sufficient heat is applied. The necessary compressive force to accomplish this latter result is derived from the shrinking of the oriented or stretched thermoset polymer induced by the heat treatment. Additional compressive force can be derived by winding the thermoset layer under tension so as to give additional compressive force to the thermoplastic material which will be still further able to fill in voids when the temperature is raised sufficiently to effect relaxation or shrinkage of the thermoset oriented polymer.

In the selection of the compressing, oriented, high energy electron irradiated thermoset polymer (hereinafter, for brevity, referred to as "thermoset polymer" or more specifically "thermoset polyethylene") to be used in the practice of the present invention, consideration should be given to the particular application involved. Thus, it may be necessary to consider the electrical properties, the tensile strength, the elongation, tear strength, resistance to various environments, such as chemicals, etc., of the shrinkable thermoset polymer. Among the polyolefins which can be used as the compressing layer are, for instance, polyethylene, polypropylene, copolymers of ethylene and propylene, blends of polyethylene and polybutadiene, etc. Prior to conversion to the thermoset state and prior to stretching or orientation, the organic polymers mentioned above can be modified in the direction of greater flexibility and elasticity by compounding therewith to form homogeneous, molecularly unoriented bulk blends, hydrocarbon elastomers such as crude rubber, reclaim rubber, balata, polybutadiene, copolymers of butadiene and isoprene, copolymers of butadiene and styrene, vulcanizable silicone rubber, etc., preferably in the form of solids having molecular weights exceeding 40,000, although lower molecular weight elasto-viscous forms of these or other hydrocarbon polymers may be substituted in whole or in part, such as those having molecular weights ranging from 1,000 to 40,000. This compounding can be accomplished by blending the materials on a rubber mill at a temperature preferably exceeding the melting point of the main organic polymer component, although solvent mixing may be another means for carrying this out. Further examples of the types of polyolefins, specifically polyethylene, contemplated in the practice of the present invention, as well as sources of such polymers, may be found disclosed in the aforesaid Lawton and Bueche application Serial No. 324,552, which by reference is made part of the disclosures of the present application.

These polyolefins can be rendered substantially thermoset, (i.e., cross-linked) and suitable for the intended use as the compressing and insulating medium by irradiation with high energy electrons. Thus, the thermosetting polyolefins, e.g., polyethylene film or tape, can be irradiated with high energy electrons in the manner described in the aforesaid Lawton and Bueche application to obtain a substantially thermoset polymer. If polyethylene is the polyolefin used, it may be any one of those readily available on the market, including those produced by high pressure or low pressure techniques and in various molecular weights ranging, for instance, from 10,000 to 100,000 or more in molecular weight. Polypropylene is in the same category as far as its ability to be converted to the heat-shrinkable, thermoset stage.

The conversion by irradiation with high energy electrons to the thermoset state may be carried out before or after stretching (or orienting) of the polyolefin. There is some evidence that slightly improved results are obtained, i.e., greater shrinkage may be accomplished if the irradiation of the polyolefin (which is intended to be illustrative of polymers alone, mechanical blends of organic polymers with other hydrocarbon polymers, or copolymers of the polymer) is carried out before the stretching of the polyolefin. This may be due to the fact that there is a slight "freezing-in" of the stretching or orientation so that by irradiation before stretching, one obtains greater shrinkage than might be expected or calculated would take place if stretching or orientation had not taken place, than if the irradiation is carried out after stretching. However, despite the fact that the irradiation does have a slight effect on the degree of orientation frozen into the polyolefin, nevertheless, although the irradiation cross-links the oriented molecules of polymer, the cross-linking is of such low order that the molecules are able to return to a random pattern upon treatment in accordance with our invention. It should be noted that if stretching or orientation occurs before irradiation, shrink-back decreases with increasing radiation doses. Thus, at higher doses of irradiation, e.g., from $10 \times 10^6$ reps. up, the shrink-back would be less under equivalent conditions than when the dose in below $10 \times 10^6$ reps.

The degree of shrinkage occasioned by heating the irradiated, stretched or drawn polyolefin in accordance with our invention can be varied widely. Thus, it is possible to draw or stretch the polymer at normal temperatures, for instance, at temperatures ranging from about 20° to 75° C. and irradiate the drawn polymer with high energy electrons with any desired dose of radiation preferably with at least $2 \times 10^6$ reps., and thereafter heat the irradiated, stretched polymer to obtain shrinkage of the polymer almost to its original dimensions. Alternatively, the same process may be employed with the exception that irradiation is carried out before the drawing or stretching operation.

Another method comprises drawing or stretching the polyolefin at elevated temperatures of from about, for example, 70° C., to temperatures as high as below the decomposition point as defined by practical limitation, and irradiating the polymer with doses sufficient to cause cross-linking of the polymer, for instance, at doses above $2 \times 10^6$ reps., and as high as 50 to $100 \times 10^6$ reps., or higher, and thereafter heating such thermoset polymer in accordance with our process. By means of this technique, namely, drawing or stretching at elevated temperatures and irradiating the drawn polymer, it is possible to reduce the degree of shrinkage as a result of the heat treatment of the stretched thermoset polymer. The higher the dose of radiation, the smaller the shrinkage which will be encountered as a result of the subsequent heat treatment. However, if the irradiation of the polymer takes place before the drawing or stretching of the polymer at elevated temperatures above 60° C., then the ability to reduce shrinkage by high dose irradiation is not present. As pointed out above, the heat-shrinkable material may be in the form of film, tape, sheets, tubing, etc., in various size and thickness, for instance, thicknesses ranging from about 0.0001 inch to as much as 0.1 inch in thickness or more, depending upon the application involved as well as the properties of heat-shrinkable polymer.

For purposes of brevity, the above-described orientable, potentially thermosetting polyolefin will hereinafter be referred to in its prestretched or oriented state only as "prestretched film" or "prestretched tape." This state of the polymer may be obtained by an intentional stretching of the film, for instance, by passing the film around rolls operating at different speeds, so that the second roll in sequence will be revolving faster than the first roll so as to stretch the polymer film to a longer dimension than it was originally. Such a stretching will give a larger dimension of the polymer than was the original film. Accordingly, the shrink-back, if practiced in accordance with our process, will be much greater than would be the shrinkage induced by our process if the only stretch or orientation introduced into the film was as a result of its being formed, for instance, by extrusion from a hot melt, wherein the extruding action and subsequent calendering and roll-up is sufficient to effect a stretched orientation of the polymer, so that it is in a molecularly oriented form, as is more particularly described in U.S. Patent 2,631,954, issued March 17, 1953. When the polyolefin film, e.g., polyethylene film, is prepared by the extrusion method and no further stretching is applied, the heat shrinkage will be less than that obtained by heat-shrinking additionally stretched or molecularly oriented sheet polymer. The extrusion procedure for orienting the molecules of the polymer, and thus give a polymer product which is in the non-relaxed state, may also be applied in the extrusion of tubing, which can also be subjected to heating at elevated temperatures (after irradiation with high energy radiation has been introduced into the tubing) to effect a shrink-back which may be useful in many purposes such as in the insulation of electrical conductors, in the encapsulation of handles of knives, screw drivers, pliers, etc. A still further means for effecting prestretching of the polymer is by sending film or flat or sheet material of thicker gauge through squeeze rolls to reduce the polymer to the finer gauges which are employed for the various purposes, such as packaging, encapsulation, insulating conductor, etc., described above. This prestretching may also be accomplished by extruding inflated tubes of polyolefin, e.g., polyethylene, in the manner described in U.S. Patent 2,632,206, issued March 24, 1953 and thereafter slitting the polymer to obtain sheet material or films of continuous nature (which may be of various thicknesses) and which can then be processed in accordance with our invention.

In carrying out the stretching or orientation operation, somewhat different results will be obtained, depending upon whether the stretching or orientation was carried out while the polyolefin is hot or cold. When the polymer film is heated during orientation or stretching, the stretched film will contain a smaller amount of molecules in the oriented state. On the other hand, if the polyolefin film is oriented while cold, a relatively large number of molecules will exist in the oriented state. This difference is independent of the extent of draw or stretch. Thus, it will be clearly evident that the shrinkage by heat of the film in its stretched and irradiated state will be a function of both the temperature and the extent of the stretching or draw, as it is often called.

It will be apparent to those skilled in the art that when stretching polyethylene, for instance, in film or in tape form, the thickness will be less after stretching than before. However, after the heating operation, following the stretching and irradiation steps, in all probability the polyethylene will relax in its random form of molecules to a thickness dimension which is essentially the same as it was before orientation or stretching. No intent is to be read into this invention as to any limitation as to thickness of the polyethylene either before or after stretching or before or after the heat treatment of the irradiated, stretched polyethylene. It is still further intended within the scope of this invention to include biaxial stretching, whereby both the length and the width dimensions of the polyethylene are stretched or oriented in the manner described above.

The thermoplastic polyolefin used in this invention may be, for instance, solid polyethylene, solid polypropylene, solid polybutadiene, etc., in tape, sheet, or other flat-stock form. Again, it is important to give consideration to the application involved in determining the type of thermoplastic polyolefin to be used. The polymer chosen should be sufficiently flowable or softenable at temperatures at which heat shrinkage of the thermoset polyolefin will take place (e.g., above 100° C.) so as to possess adequate flow to fill the gaps and voids in the total structure being formed.

The layers of thermoplastic and thermoset polymers used in forming the unitary structures may be separate layers in which the thermoset layer overlies the thermoplastic layer. Alternatively, laminates composed of the thermoplastic and thermoset materials may be used whereby prior to use, a laminate is formed from attachment of the thermoplastic layer to the thermoset layer by mechanical or by chemical means.

In applying the two different types of polyolefins herein described, it is desirable that the thermoplastic layer (or layers) be applied first and that directly on the first layer or after several layers of thermoplastic layers have been applied, one applies one or more layers of the thermoset oriented polyolefin.

The attached drawing shows two embodimnets of our invention illustrating two methods for applying tapes around insulated conductors. FIGURE 1 shows a two-layer structure composed of an insulating metallic core 1 (e.g., copper) an outer layer 2 of thermoset polyolefin, for instance, irradiated polyethylene, and an inner layer 3 of thermoplastic polymer, for instance unirradiated polyethylene. The wrappings of the two tapes are carried out simultaneously in one operation.

Figure 2:
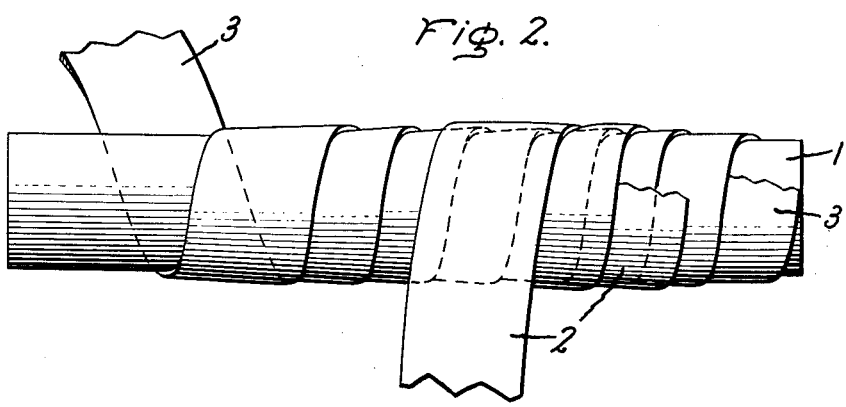

FIGURE 2 shows an insulated conductor in which the metallic core 1 is insulated by alternate layers composed of an outer layer 2 of thermoset polymer applied after the inner thermoplastic layer 3 has been wound around the metalilc core.

In order that those skilled in the art may better understand how the present invention may be practiced, the following examples are given by way of illustration and not by way of limitation. All parts are by weight.

The polyethylene employed in the examples was one manufactured and sold by Du Pont under the name "Alathon" and had a molecular weight of from about 20,000 (when measured by the intrinsic viscosity method). The thermoset, irradiated polyethylene used in the following examples was obtained by irradiating polyethylene film with high energy electrons from a high voltage accelerating apparatus to a total dose of about $7 \times 10^6$ reps. as described in the above-mentioned Lawton and Bueche application. In the following examples, the polyethylene had been stretched or oriented, prior to irradiation, sufficiently so that when heated at about 150° C., it would return to approximately 50 percent of its stretched dimension.

EXAMPLE 1

A ¾" brass bar was wrapped (in the same direction) with irradiated polyethylene tape 5 mils × 1" in a one-half lap fashion, four wraps, to give a total build of 56 mils. A similar bar was wrapped with irradiated polyethylene tape 8 mils thick and 1" wide in a half lap fashion, two wraps, in the same direction, to give a total build of 50 mils. The ends of the wrappings were made fast so that they could not unravel. These structures were heated at 150° C. for one hour to effect heat-shrinkage of the irradiated polyethylene in both cases, and thereafter the corona starting voltage and electrical breakdown of the structure were tested.

Table I

| Insulation Thickness, mils | Corona Start Voltage, volts/mil | Breakdown, volts/mil |
|---|---|---|
| 56 | 66–72 | 450–465 |
| 50 | 70–78 | 360–390 |

The above corona starting voltages, which are a measure of the voids in the structure, show that these 100 percent irradiated polyethylene structures were unsatisfactory. This was substantiated by the fact that visual examination showed that there was evidence of electrical tracking at the points of failure and this tracking took place at the lap mark in each structure.

EXAMPLE 2

A ¾" brass bar was wrapped with a composite dual tape made by positioning 1½ mil × 1" unirradiated polyethylene tape on 5 mil × 1" irradiated polyethylene tape and wrapping concurrently on the bar with the unirradiated film nearest the bar. The wrap was ½ lap with 4 wraps in the same direction, giving a total final build of about 52 mils. A second bar was wrapped similarly with a composite made from 1½ mil × 1" polyethylene tape on 8 mil × 1" irradiated polyethylene tape. The arrangement of the films was the same as above with ½ lap and a total of 2 wraps, giving a total final build of about 36 mils. Both of these structures were shrunk by heating them at 150° C. for one hour and then tested similarly as was done in Example 1. The results of these tests are as follows:

Table II

| Insulation Thickness, mils | Corona Start Voltage, volts/mil | Breakdown, volts/mil |
|---|---|---|
| 52 | 125–220 | 715–750 |
| 36 | 290–500 | 610–800 |

EXAMPLE 3

Two samples of 5/16" stranded wire cable were wrapped as follows:

(1) 8 mil × 1" irradiated polyethylene tape, ½ lap, 4 wraps.

(2) 1½ mil × 1" unirradiated polyethylene film in combination with 8 mil × 1" irradiated polyethylene tape, ½ lap, 3 wraps, the unirradiated tape being underneath the irradiated layer throughout the wrapping and being in direct contact with the bare conductor.

Each of these structures was heated at 150° C. for one hour to effect shrinkage of the oriented, irradiated surface wrap, and examined by stripping off a portion of each of the insulations. The composite structure composed of the unirradiated and irradiated polyethylene wraps was marked by the presence of very sharp ridges, indicating that the shrinking of the irradiated polyethylene had forced the thermoplastic, unirradiated polyethylene into the wedge-shaped voids underneath the irradiated layer caused by the laps, to give a substantially void-free structure. In contrast to this, the assembly composed only of wraps of irradiated polyethylene had round, rather than sharp, ridges, leaving voids underneath the layers of the irradiated polyethylene coming in contact with the lapped portions thereunder.

EXAMPLE 4

Copper wire about 1/32" in diameter was wound on wooden spools to form tight coils. Several of these wound spools were wrapped with from 6 to 12 layers of 8-mil thick, stretched, irradiated polyethylene tape of a width about 1/4" longer than the spools. The outer end of the tape was fastened securely to each assembly. Other spools were first wrapped with a layer of unirradiated polyethylene tape of from 6 to 30 mils thick and then covered with from 3 to 6 layers of 8-mil oriented, irradiated polyethylene tape, again fastening the outer ends to the layers immediately underneath. Both groups of spools were heated for one hour at 150° C. to effect shrinkage of the irradiated, oriented polyethylene. After cooling, the polyethylene coverings were cut off for examination. In the cases of the spools wrapped with the irradiated polyethylene alone, air gaps were left between the covering and the wire at the crevices between the wires. However, in the case of the spools wrapped with both the unirradiated and irradiated polyethylene composite structure, there were no visible air gaps between the wire and the covering, and the unirradiated thermoplastic polyethylene had been squeezed down into the crevices between the wires and at the ends of the coil.

EXAMPLE 5

An insulated conductor similar to that described in Example 2 can be prepared by wrapping the metallic conductor core (e.g. copper, aluminum, alloys of aluminum and copper, etc.) with thin polypropylene tape (about 5 to 10 mils thick and about 1" wide) which has been previously oriented or stretched to about twice its original length and has been irradiated with high energy electrons similarly as was done with the irradiated polyethylene of Example 2. In making this insulated conductor, a layer of thermoplastic polyethylene (or one could use thermoplastic polypropylene) having a softening point of 80° C., and similar to that described in Example 2, is interposed between the irradiated polypropylene and the thermoplastic unirradiated polyethylene layers. Upon heating of this assembly at about 100° to 150° C. for approximately 1 to 2 hours, shrinkage of the irradiated polypropylene will be effected to compress the layer of polypropylene around the conductor and to cause fusion and migration of the thermoplastic polyethylene so that the latter flows into any voids which may occur as a result of the overlapping wraps of insulation composed of the irradiated polypropylene. Testing of this type of insulating structure will establish that the corona starting voltage and the break down volts will be higher than that of insulated conductors in which the thermoplastic polyethylene layer is omitted.

It will, of course, be apparent to those skilled in the art that instead of using irradiated polyethylene or unirradiated polyethylene in the above examples, one can also employ other types of stretched or oriented thermoset polyolefins and other thermoplastic polyolefins, many examples of which have been given above, employing high energy electrons to render the polyolefins thermoset. Different degrees of irradiation may also be employed. In addition, the method of wrapping the temperatures at which the structures are heated to give the heat-shrunk, void-free structures can be varied in accordance with the disclosures and teachings described above.

The combination of the thermoset and thermoplastic polyolefins, particularly the combination of the thermoplastic, unirradiated polyethylene and the oriented polyethylene rendered substantially thermoset by means of high energy electrons, finds eminent use in the fabrication of dense, void-free structures having laminar constructions. By means of our invention, irregular objects can be covered with a plastic coating by a wrapping technique, and this wrapping can be densified to a void-free, tightly adherent, moisture-resistant and air-resistant structure by heating. This principle finds eminent use in electrical applications, such as in the insulation of motor coils, cables, and other conductors. Conductors insulated in this fashion can be employed in the high voltage field, particularly as insulation for high voltage power cables.

It will be readily appreciated that other forms of electron accelerating apparatus may be employed instead of the high voltage apparatus used for irradiating the polyolefins of the present invention, as is more particularly described in the aforementioned Lawton and Bueche application. For example, linear accelerators of the type described by J. C. Slater in the "Reviews of Modern Physics," vol. 20, No. 3, pp. 473–518 (July 1948) may be utilized. In general, the energy of the electrons employed in the practice of the invention may range from about 50,000 electron volts to 20 million electron volts or higher, depending upon the depth to which it is desired to affect the polymeric materials. To decrease wasteful energy absorption between the point of exit of electrons from the accelerating apparatus and the polymeric materials, a vacuum chamber having thin entrance and exit windows may be inserted in the space.

While the present invention has been described by reference to particular embodiments and examples thereof, alternatives will readily occur to those skilled in the art. It is, therefore, intended in the appended claims to cover all such equivalents as may be in the true spirit and scope of the foregoing description. For example, various fillers, modifying agents, such as dyes, pigments, stabilizers, etc., may be added to the various polyethylene compositions herein described without departing from the scope of the invention.

Some confusion has existed as to the units employed for measuring high energy radiation. In general, two types of units are employed, namely, (1) Roentgen units and (2) Roentgen equivalent physical units. Roentgen units are commonly used to measure gamma and X-rays and are usually defined as the amount of radiation that produces one electrostatic unit of charge per milliliter of dry air under standard conditions. The Roentgen equivalent physical unit (the "rep.") is a convenient unit which usually describes the radiation dose from other than gamma or X-rays, and is the measure of the ionization in the absorber or tissue. The ionization produced by primary radiation is expressed as one rep. when the energy lost in tissue is equivalent to the energy lost by the absorption of one Roentgen of gamma or X-rays in air. Further definitions of "Roentgen" and "rep." can be found on page 256 of the book "The Science and Engineering of Nuclear Power" edited by Clark Goodman (1947), and on page 436 of "Nuclear Radiation Physics" by Lapp and Andrews (1948). For convenience, the term "Roentgen equivalent physical" or, more specifically, the abbreviation therefor, "rep." has been employed in the instant application.

What we claim as new and desire to secure by Letters Patent of the United States is:

1. The process of forming an insulated electrical conductor which comprises (1) applying around an electrical conductor wraps of an oriented, stretched polyolefin crosslinked by irradiation with high energy electrons, there being interposed between the wraps of said oriented, stretched polyolefin and the surface of said electrical conductor a layer of thermoplastic polyolefin having a softening point above 80° C. and (2) heating the resulting assembly at a temperature above the softening point of said thermoplastic polyolefin and in the range in which said oriented, stretched polyolefin tends to shrink to effect shrinkage of said oriented, stretched polyolefin, thereby causing migration of said thermoplastic polyolefin to fill in the voids usually present when said oriented, stretched polyolefin is heated and shrunk in the absence of said thermoplastic polyolefin.

2. The process of forming an insulated electrical conductor which comprises (1) applying around an electrical conductor wraps of an oriented, stretched polyethylene which has been rendered substantially thermoset by irradiation with high energy electrons, there being interposed between the wraps of said oriented, stretched polyethylene and the surface of said electrical conductor, a layer of thermoplastic polyolefin having a softening point above 80° C. and (2) heating the resulting assembly at a temperature above the softening point of said thermoplastic polyolefin and in the range in which said oriented, stretched polyethylene tends to shrink to effect shrinkage of said oriented, stretched polyethylene, thereby causing migration of said thermoplastic polyolefin to fill in the voids usually present when said oriented, stretched polyethylene is heated and shrunk in the absence of said thermoplastic polyolefin.

3. The process of forming an insulated electrical conductor which comprises (1) applying around an electrical conductor a series of wraps of an oriented, stretched polyethylene which has been rendered substantially thermoset by irradiation with high energy electrons, there being interposed between said series of wraps of said oriented, stretched polyethylene and the surface of said electrical conductor a layer of a thermoplastic polyethylene having a softening point above 80° C. and (2) heating the entire resulting assembly at a temperature above the softening point of said thermoplastic polyethylene and in the range in which said oriented, stretched polyethylene tends to shrink to effect shrinkage of said oriented, stretched polyethylene, thereby causing said thermoplastic polyethylene to flow and fill in the voids usually present when said oriented, stretched polyethylene is heated and shrunk in the absence of said thermoplastic polyethylene.

4. The process which comprises (1) applying around an insulated electrical conductor a series of wraps of an oriented, stretched polypropylene which has been rendered substantially thermoset by irradiation with high energy electrons, there being interposed between said series of wraps of said oriented, stretched polypropylene and the surface of said electrical conductor a layer of thermoplastic polyethylene having a softening point above 80° C. and (2) heating the entire assembly at a temperature above the softening point of said thermoplastic polyethylene and in the range in which said oriented, stretched polypropylene tends to shrink to effect shrinkage of said oriented, stretched polypropylene, thereby causing migration of said thermoplastic polyethylene to fill in the voids usually present when said oriented, stretched polypropylene is heated and shrunk in the absence of said thermoplastic polyethylene.

5. The process of forming an insulated electrical conductor which comprises (1) wrapping about an electrical conductor an oriented, stretched polypropylene which has been rendered substantially thermoset by irradiation with high energy electrons, there being interposed between said oriented, stretched polypropylene and the surface of said electrical conductor a layer of a thermoplastic polyolefin having a softening point above 80° C. and (2) heating the resulting assembly at a temperature above the softening point of said thermoplastic polyolefin and in the range in which said oriented, stretched polypropylene tends to shrink to effect shrinkage of said oriented, stretched polypropylene, thereby causing migration of said thermoplastic polyolefin to fill in the voids usually present when said oriented, stretched polypropylene is heated and shrunk in the absence of said thermoplastic polyolefin.

6. An insulated electrical conductor comprising a conductor, a layer of a thermoplastic polyolefin having a softening point above 80° C. in contact with the surface of said conductor and wraps of an oriented, stretched polyolefin cross-linked by irradiation with high energy electrons about said layer to form an assembly, said assembly having been heated after assembly at a temperature above the softening point of said thermoplastic polyolefin and in the range in which said oriented, stretched polyolefin tends to shrink to effect shrinkage of said oriented, stretched polyolefin about said thermoplastic polyolefin, whereby said thermoplastic polyolefin flows into the voids usually present when said oriented, stretched polyolefin is heated and shrunk in the absence of said thermoplastic polyolefin.

References Cited in the file of this patent

UNITED STATES PATENTS

| 2,438,956 | Warner | Apr. 6, 1948 |
| 2,523,082 | Wilson | Sept. 19, 1950 |
| 2,631,186 | Bondon | Mar. 10, 1953 |
| 2,695,251 | Bright | Nov. 23, 1954 |
| 2,836,744 | Clawson | May 27, 1958 |

FOREIGN PATENTS

| 606,752 | Great Britain | Aug. 19, 1948 |
| 735,532 | Great Britain | Aug. 24, 1955 |

OTHER REFERENCES

Ballantine: Progress Report on Fission Products Utilization VI, Further Studies of the Effect of Gamma Radiation on Vinyl Polymer Systems, Brookhaven National Laboratory (Upton, N.Y.), unclassified as of March 1954, U.S. Atomic Energy Commission, Technical Information Service Extension, Oak Ridge, Tennessee, pages 15–18.

Charlesby, "How Radiation Affects, Long-Chain Polymers," Nucleonics, June 1954, pages 18-25.

UNITED STATES PATENT OFFICE
CERTIFICATE OF CORRECTION

Patent No. 3,033,727

May 8, 1962

Kenneth H. Cram et al.

It is hereby certified that error appears in the above numbered patent requiring correction and that the said Letters Patent should read as corrected below.

Column 1, line 30, strike out "now Patent No. 2,961,336".

Signed and sealed this 3rd day of September 1963.

(SEAL)
Attest:

ERNEST W. SWIDER
Attesting Officer

DAVID L. LADD
Commissioner of Patents